(12) United States Patent
Takahashi

(10) Patent No.: US 6,575,643 B2
(45) Date of Patent: Jun. 10, 2003

(54) CAMERA APPARATUS

(75) Inventor: Masami Takahashi, Zushi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/872,595

(22) Filed: Jun. 1, 2001

(65) Prior Publication Data

US 2001/0048816 A1 Dec. 6, 2001

(30) Foreign Application Priority Data

Jun. 2, 2000 (JP) .......................... 2000-166289

(51) Int. Cl.[7] .......................... G03B 15/00; G03B 17/48
(52) U.S. Cl. .......................... 396/351; 396/428; 396/429; 348/36; 348/118; 359/846; 359/872
(58) Field of Search .......................... 396/351, 429, 396/428; 348/118, 36, 147; 359/846, 872

(56) References Cited

U.S. PATENT DOCUMENTS 4,549,208 A * 10/1985 Kamejima et al. .......... 348/147
6,118,474 A * 9/2000 Nayar .......................... 348/36
6,304,285 B1 * 10/2001 Geng ........................... 348/36
6,412,961 B1 * 7/2002 Hicks .......................... 359/846

FOREIGN PATENT DOCUMENTS

| JP | 58-194640 | 11/1983 |
| JP | 62-61486 | 3/1987 |
| JP | 63-20971 | 1/1988 |
| JP | 1-321428 | 12/1989 |
| JP | 3-182848 | 8/1991 |
| JP | 9-73117 | * 3/1997 |
| JP | 9-118178 | 5/1997 |
| JP | 9-202180 | 8/1997 |
| JP | 11-170911 | 6/1999 |

* cited by examiner

Primary Examiner—Delores Rutledge
(74) Attorney, Agent, or Firm—Pearne & Gordon LLP

(57) ABSTRACT

The camera apparatus includes a camera main body and a convex mirror. A picture reflected by the convex mirror is taken by the camera main body. Even if the angle of view of a camera lens is set small and the camera main body is made compact, a picture having a wide angle of view can be taken through the convex mirror.

4 Claims, 9 Drawing Sheets

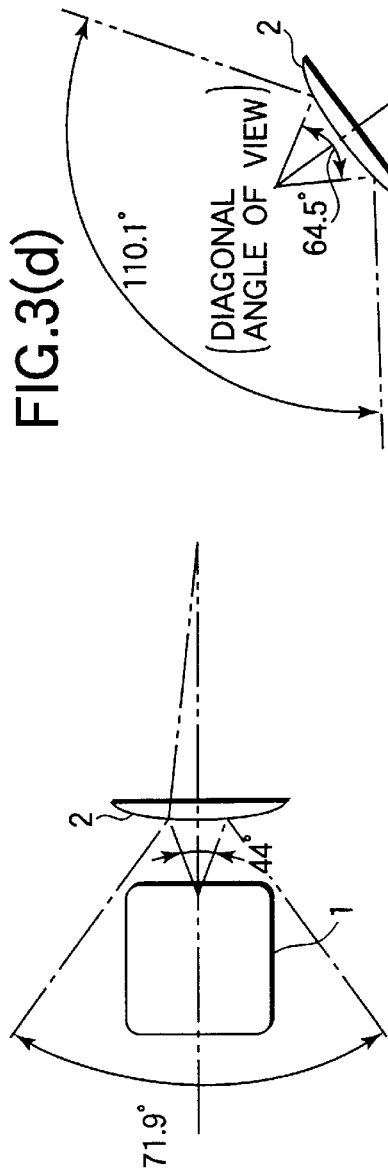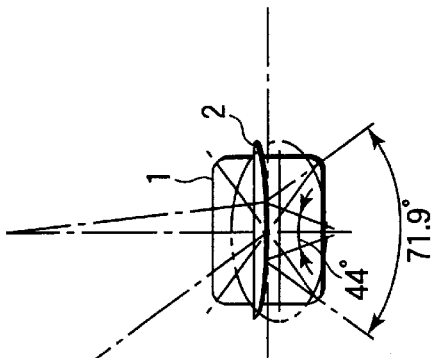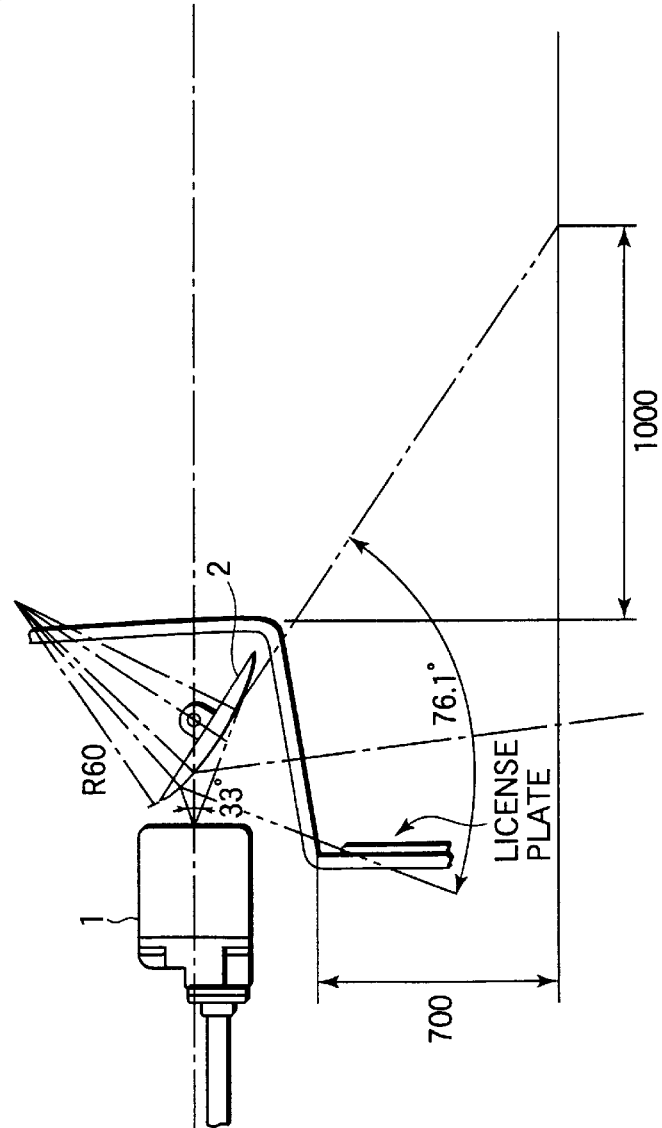

FIG.6(a)
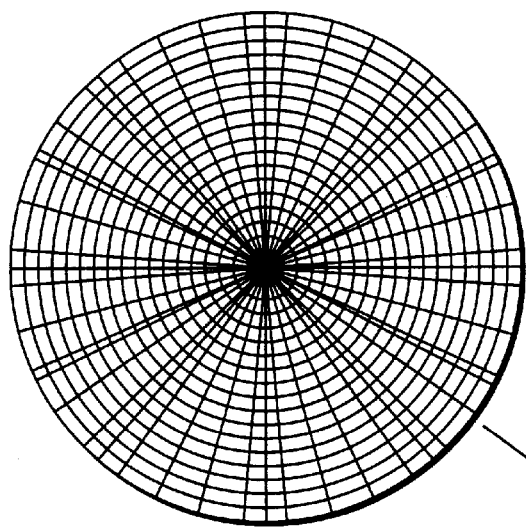
FIG.6(c)
VERTICAL DIRECTION
FIG.6(b)
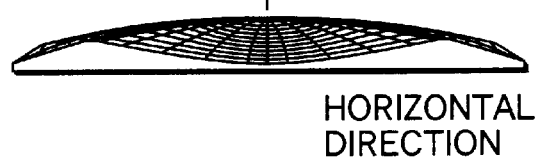
HORIZONTAL DIRECTION
DIAGONAL DIRECTION
FIG.6(d)
FIG.6(e)
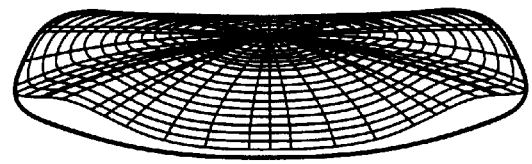

CAMERA APPARATUS

BACKGROUND OF THE INVENTION

1. Field of the Invention

The present invention relates to a camera apparatus to be carried on a vehicle or to be installed for monitoring and, in particular, to such a camera apparatus which can be made small in size and is capable of having a wide angle of view.

2. Description of the Related Art

Conventionally, in order to secure the safe driving of a vehicle, the vehicle carries an onboard small-sized camera apparatus which can take a picture of a driver's blind spot. This camera apparatus is installed, for example, in the rear portion of a large-sized vehicle in an exposed manner, while a picture taken by the camera apparatus can be displayed on a monitor disposed in front of a driver's seat. Due to this, while confirming the condition behind the vehicle through the monitored picture, the driver is able to back up the vehicle.

Such a camera apparatus for monitoring is required to have a large angle of view, because it must take a picture of a wide area. In this case, however, there occurs a phenomenon in which the picture is distorted due to the wide angle of view. Also, in order to enhance the freedom of installation of the place of the camera apparatus, or, in order to prevent the camera apparatus from spoiling the design of the vehicle, a compact structure is required of such a camera apparatus. The angle of view of a camera lens, as shown in FIG. 12, includes a horizontal angle of view, a vertical angle of view, and a diagonal angle of view. These angles of view can be spread in a case where a wide-angle lens is used as the camera lens; and, due to the progress in the lens manufacturing technique, production of a wide-angle lens is now possible. In a case where the wide-angle lens is used as the camera lens, when compared with the horizontal and vertical angles of view, the diagonal angle of view is increased further, with the result that the distortion of the picture is increased.

On the other hand, the main body of the camera, as shown by dotted lines in FIG. 10(a), must be structured so as to have a size which is able to receive all of light rays is in a range of an angle of view (shown by solid lines in FIG. 10(a)) of the lens. However, as shown in FIG. 10(b), in a case where a part of the range of an angle of view of the lens cannot be received by the camera main body, as shown in FIG. 11, there occurs a so called vignetting phenomenon in which the corners of the monitor screen are cut off or out of focus.

To prevent such vignetting phenomenon, the camera main body must be made large in size according to an increase in the angle of view; however, this is contrary to the size reduction of the camera.

As described above, it is possible to make compact the camera lens and camera main body themselves but, in such a case, there occurs a vignetting phenomenon on the monitor screen, which blocks the size reduction of the camera apparatus.

SUMMARY OF THE INVENTION

The present invention aims at eliminating the drawbacks found in the above-mentioned conventional camera apparatus. Accordingly, it is an object of the invention to provide a camera apparatus which can be made compact in size and is capable of having a wide angle of view.

In attaining the above object, according to the invention, there is provided a camera apparatus including a camera main body and a convex mirror wherein a picture reflected by the convex mirror is taken by the camera main body.

According to the present camera apparatus, even if the angle of view of a camera lens is set small and the camera main body is structured compact, a picture corresponding to a wide angle of view can be taken through the convex mirror.

BRIEF DESCRIPTION OF THE DRAWINGS

FIGS. 3(a) to 3(d) are views to show the angles of view of an onboard camera apparatus according to the first embodiment of the invention;

FIGS. 6(a) to 6(e) are views of a convex mirror employed in an onboard camera apparatus according to a second embodiment of the invention;

DETAILED DESCRIPTION OF THE PREFERRED EMBODIMENTS

First Embodiment

Figure 1:
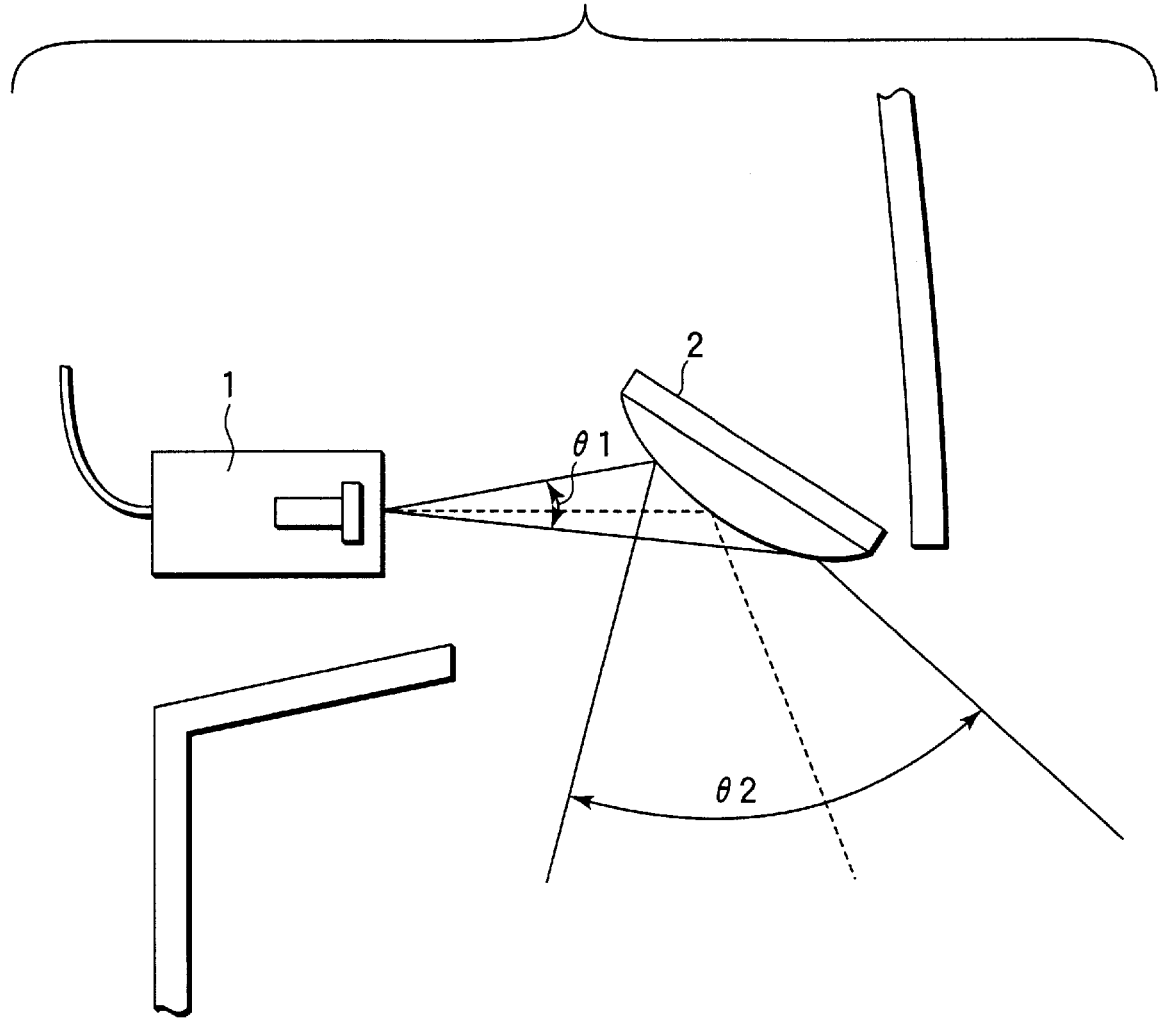
FIG. 1 is an enlarged view of a first embodiment of an onboard camera apparatus according to the invention.
Figure 2:
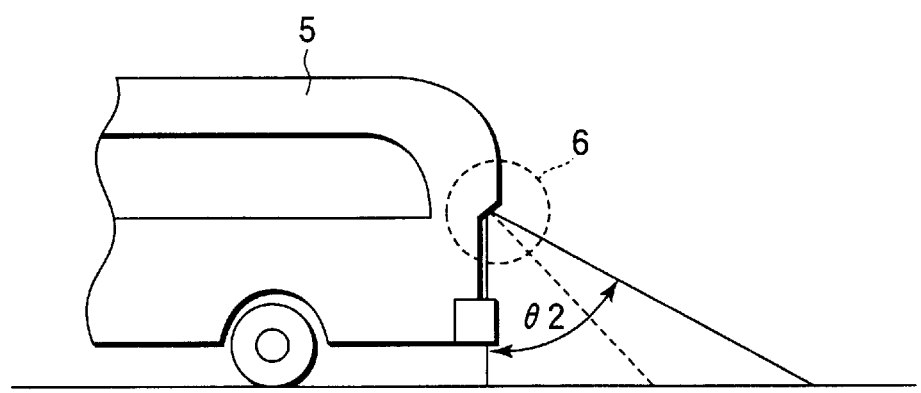
FIG. 2 is a view to show the installation position of an onboard camera apparatus according to the first embodiment of the invention.

A camera apparatus according to a first embodiment of the invention, as shown in FIG. 2, is installed for monitoring downward at the rear portion of the vehicle 5. FIG. 1 shows the installation position 6 of this onboard camera apparatus 1 in an enlarged manner. The onboard camera apparatus 1 is carried horizontally in the vehicle, and there is disposed a convex mirror 2 in front of the camera apparatus 1. The body of the vehicle is opened in part, and the light entering through the opening of the vehicle body is reflected by the convex mirror 2. The thus reflected light enters the camera apparatus 1 so that it is picked up by the camera apparatus According to the camera apparatus 1, although the angle of view θ1 of the lens of the camera apparatus 1 is set small, because the convex mirror 2 has a wide angle of view θ2, a picture taken with the wide angle of view θ2 can be sent to a monitor by taking a picture reflected by the convex mirror 2.

FIGS. 3(a) to 3(d) show the difference between an angle of view given by a structure using only the lens of the onboard camera apparatus 1 and an angle of view given by a structure using the convex mirror 2 in combination with the lens of the onboard camera apparatus 1 according to a horizontal angle of view, a vertical angle of view and a diagonal angle of view. The lens of the onboard camera apparatus 1 has a horizontal angle of view of 44°, a vertical angle of view of 33° and a diagonal angle of view of 64.5°. The convex mirror 2 includes a reflecting surface which is composed of a spherical surface having a radius of curvature R of 60 mm. In this case, the angles of view of the onboard camera apparatus 1 using the convex mirror 2 are increased in the following manner: that is, the horizontal angle of view, as shown in FIG. 3(c), is increased to 71.9°; the vertical angle of view, as shown in FIG. 3(a), is increased to 76.1°; and, the diagonal angle of view, as shown in FIG. 3(d), is increased to 110.1°.

Figure 4:
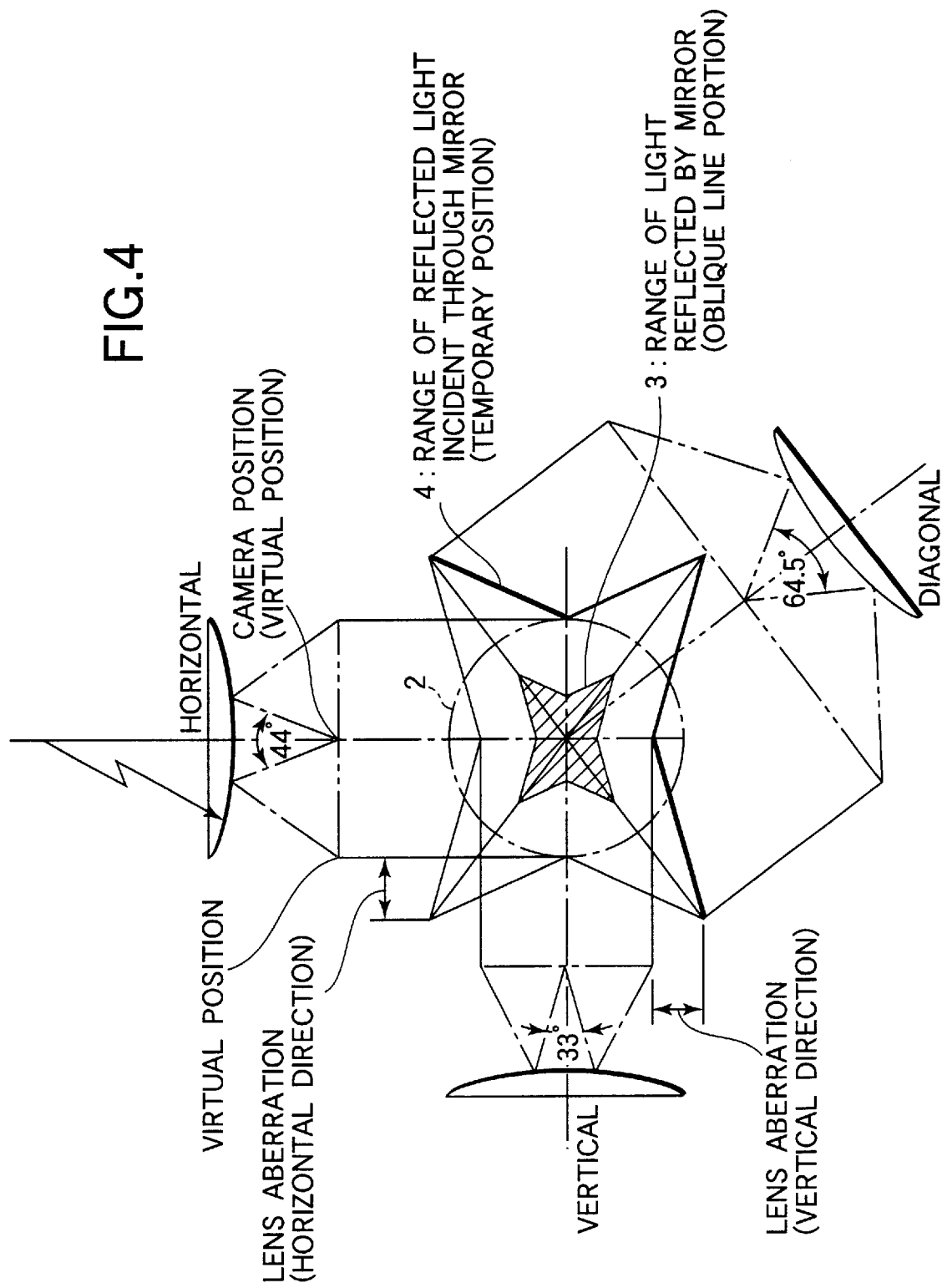
FIG. 4 is a view to show the distortion aberration of an onboard camera apparatus according to the first embodiment of the invention.

FIG. 4 shows the characteristics of distortion aberration which is given by the camera apparatus 1. However, here, there is shown distortion aberration which is obtained when the camera apparatus 1 and convex mirror 2 are disposed opposed to each other. In FIG. 4, the range of the light to be reflected by the convex mirror 2 is expressed as an oblique line portion 3, while an optical path surface, through which the reflected light by the convex mirror 2 enters the camera apparatus 1, is expressed as a solid line portion 4.

That is, in a case where a convex mirror is disposed in front of a camera apparatus and a picture obtained by reflecting the light by the convex mirror is taken, the substantial angle of view of the camera apparatus can be increased.

Further, if an angle of view is halved, the size of a camera apparatus itself can be miniaturized into about one fourth.

Also, according to the camera apparatus 1, since a subject is reflected by the convex mirror, it is not necessary to point the camera apparatus 1 directly at the subject. Due to this, as shown in FIG. 1, the onboard camera apparatus can be stored in the interior portion of the vehicle. This can prevent the onboard camera apparatus against dirt or damage which would occur when it is installed on the outer portion of the vehicle. Due to this, there is eliminated a fear that the onboard camera apparatus can project outwardly of the vehicle to thereby spoil the design of the vehicle.

Second Embodiment

Now, in a camera apparatus according to a second embodiment of the invention, the convex mirror is formed as an aspherical surface to thereby reduce the distortion aberration of an optical path surface through which the light enters the camera apparatus. The present camera apparatus is similar in structure to the camera apparatus according to the first embodiment except for the aspherical surface of the convex mirror.

Figure 5:
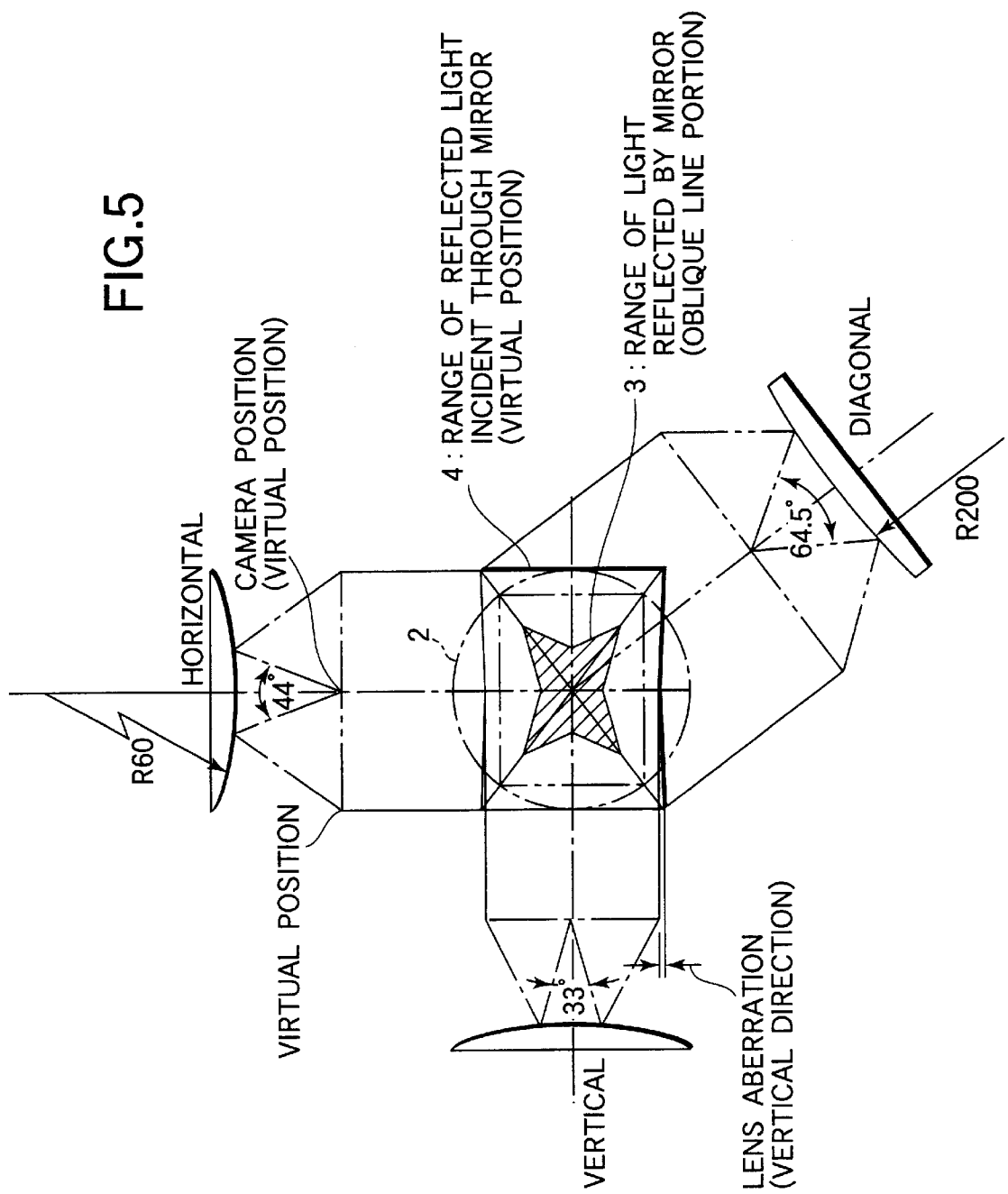
FIG. 5 is a view to show the distortion aberration of an onboard camera apparatus according to a second embodiment of the invention.
Figure 7B:
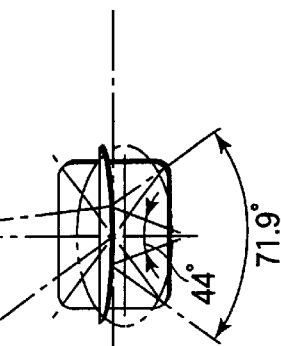
FIGS. 7(a) to 7(d) are views to show the angles of view of an onboard camera apparatus according to the second embodiment of the invention.
Figure 7D:
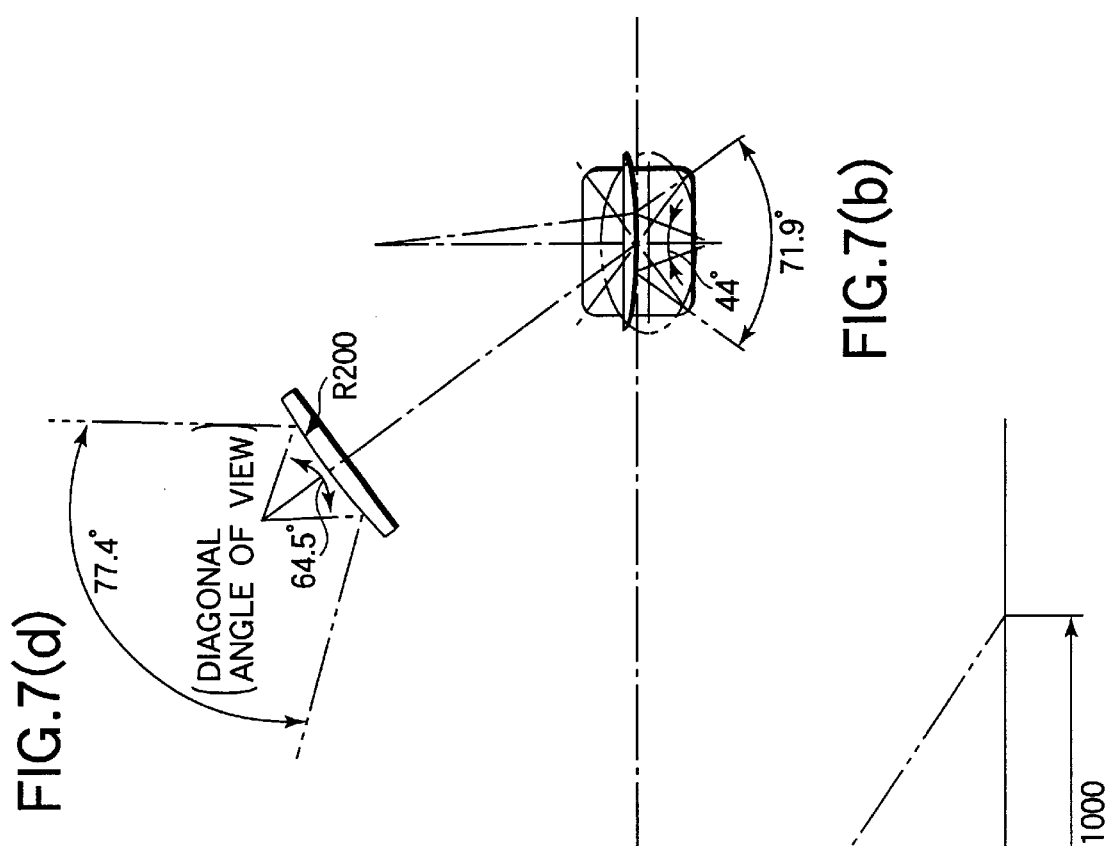
Figure 7C:
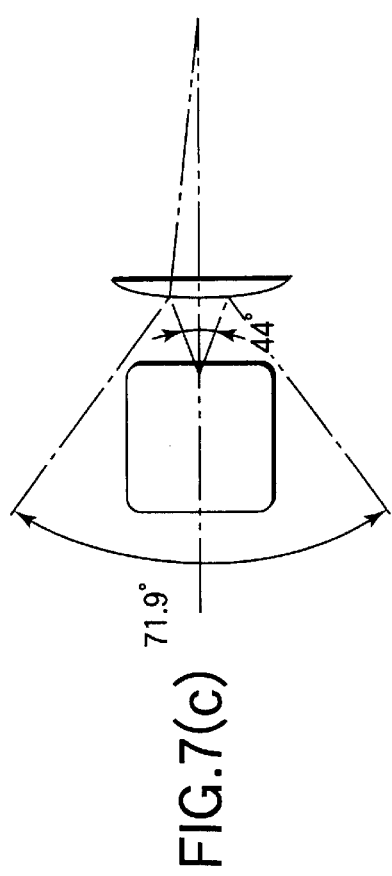
Figure 7A:
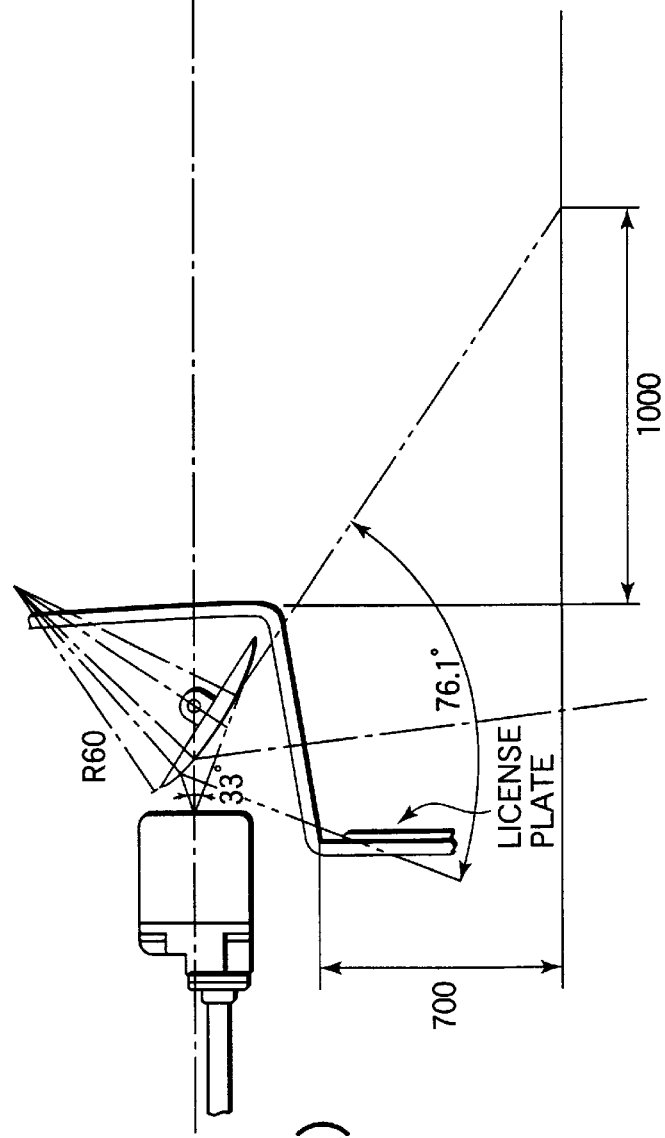

FIG. 5 shows the distortion aberration of an optical path surface through which the light enters the camera apparatus including a convex mirror having an aspherical surface.

In the case of this convex mirror 2, the radii of curvature in the directions of the horizontal and vertical angles of view are respectively set for 60 mm. The radius of curvature of the diagonal angle of view thereof is set for 200 mm, and between the directions of the horizontal and diagonal angles of view as well as between the directions of the vertical and diagonal angles of view, the radius of curvature is gradually varied so that the reflecting surface can provide a smooth curved surface.

Now, FIGS. 6(a) to 6(e) show the shape of the convex mirror 2 using a wireframe model. Specifically, FIG. 6(a) is a plan view of the convex mirror 2, FIG. 6(b) is a side view thereof in the direction of the horizontal angle of view, FIG. 6(c) is a side view thereof in the direction of the vertical angle of view, FIG. 6(d) is a side view thereof in the direction of the diagonal angle of view, and FIG. 6(e) is a perspective view thereof.

In the camera apparatus according to the second embodiment, the curvature of the convex mirror 2 in the direction of the diagonal angle of view where large distortion aberration occurs is set gentle, thereby being able to reduce the distortion aberration of the range 3 of the light reflected by the convex mirror 2 and the distortion aberration of the optical path surface 4 of the light through which the light reflected by the convex mirror 2 enters the camera apparatus 1.

Now, FIGS. 7(a) to 7(d) show a case where the present convex mirror 2 is applied to an onboard camera. The lens of this onboard camera 1, similarly to the first embodiment, has a horizontal angle of view of 44°, a vertical angle of view of 33° and a diagonal angle of view of 64.5°. In this case, the onboard camera apparatus 1 using the convex mirror 2 having an aspherical surface has such angles of view as follows: that is, the horizontal angle of view thereof (FIG. 7(c)) is 71.9°, the vertical angle of view thereof (FIG. 7(a)) is 76.1°, and the diagonal angle of view thereof (FIG. 7(d)) is 77.4°.

According to the present camera apparatus, the distortion of the optical path surface onto which the light is incident is reduced to thereby be able to reduce the size of the structure of the camera main body of the camera apparatus further.

Third Embodiment

Now, in a third embodiment according to the invention, description will be given of a different shape of an aspherical-surface convex mirror.

Figure 9:
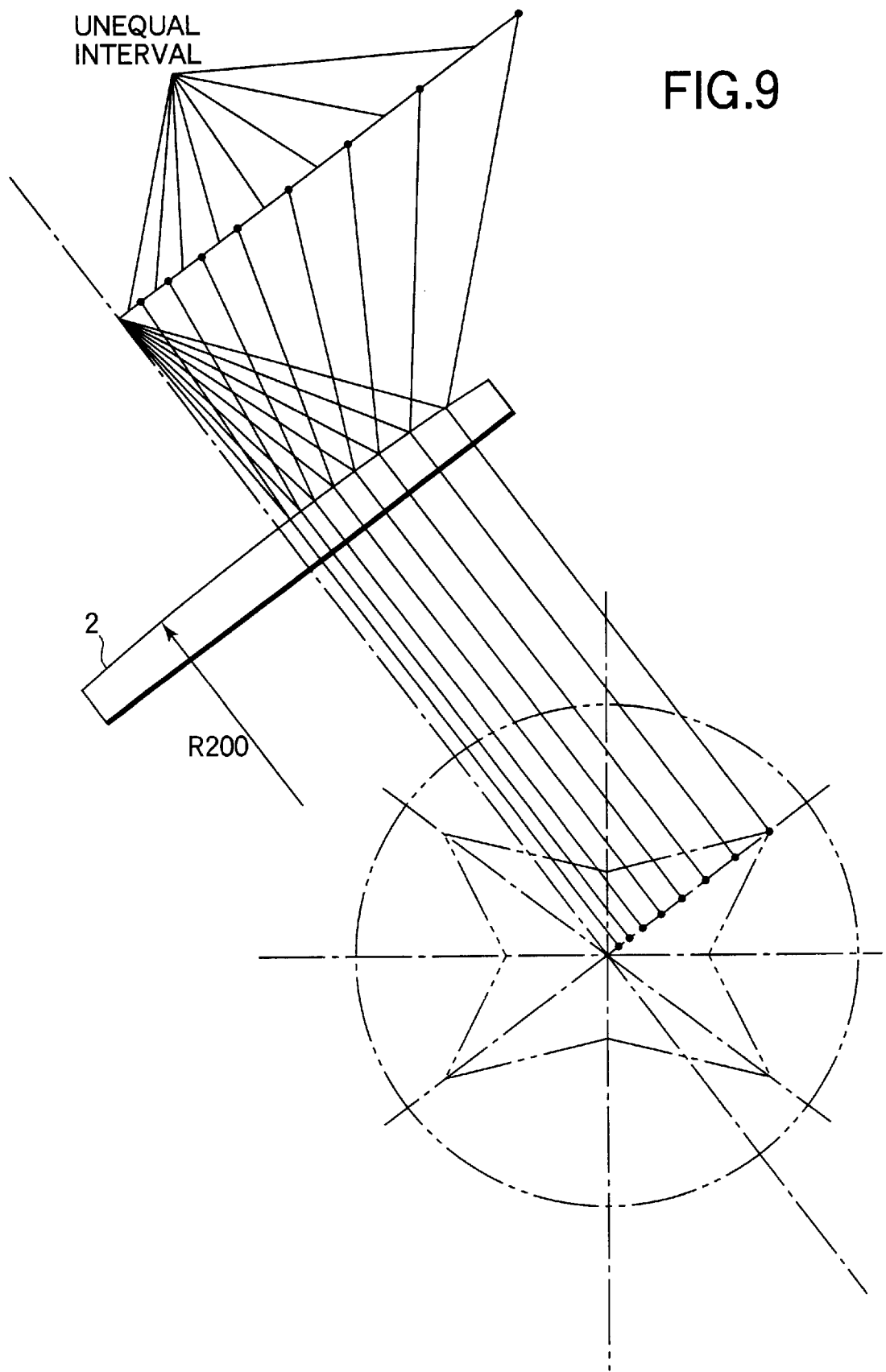
FIG. 9 is a view to explain distortion aberration obtained in a case where the radius of curvature of a convex mirror is constant.
Figure 10A:
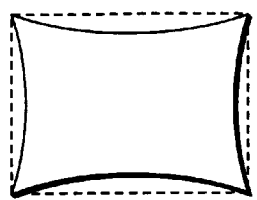
FIGS. 10(a) and 10(b) are views to explain the relation between angles of view and a camera apparatus.
Figure 10B:
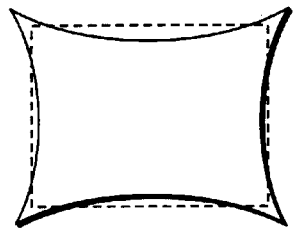
Figure 11:
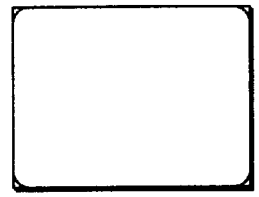
FIG. 11 is a view to explain how a vignetting phenomenon occurs on a monitor screen.
Figure 12:
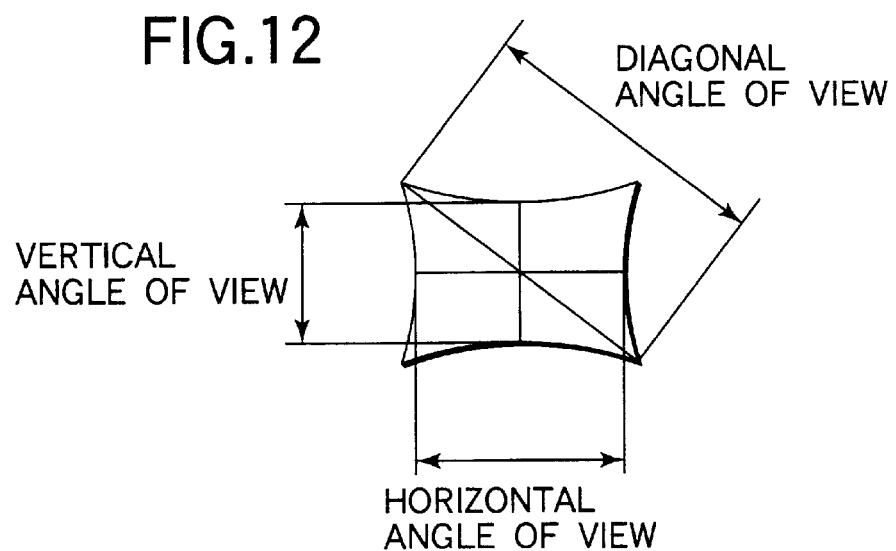
FIG. 12 is a view to explain the angles of view of a lens used in a camera apparatus.

In the aspherical-surface convex mirror according to the second embodiment, although the radius of curvature of the convex mirror in the diagonal angle of view direction is set larger than those of the convex mirror in the directions of the horizontal and vertical angles of view, the radius of curvature (R=200) itself is the same at every positions in the direction of the diagonal angle of view. In this case, as shown in FIG. 9, light rays, which are radiated from a point in such a manner that they are shifted by an equal angle from one another, are reflected by the reflecting surface having a curvature of R=200 and the thus reflected light rays arrive at the camera apparatus. The intervals between the light rays at the arrival time are wider as the light rays are more distant from the optical axis of the camera apparatus. The difference between the intervals provide distortion aberration.

Figure 8:
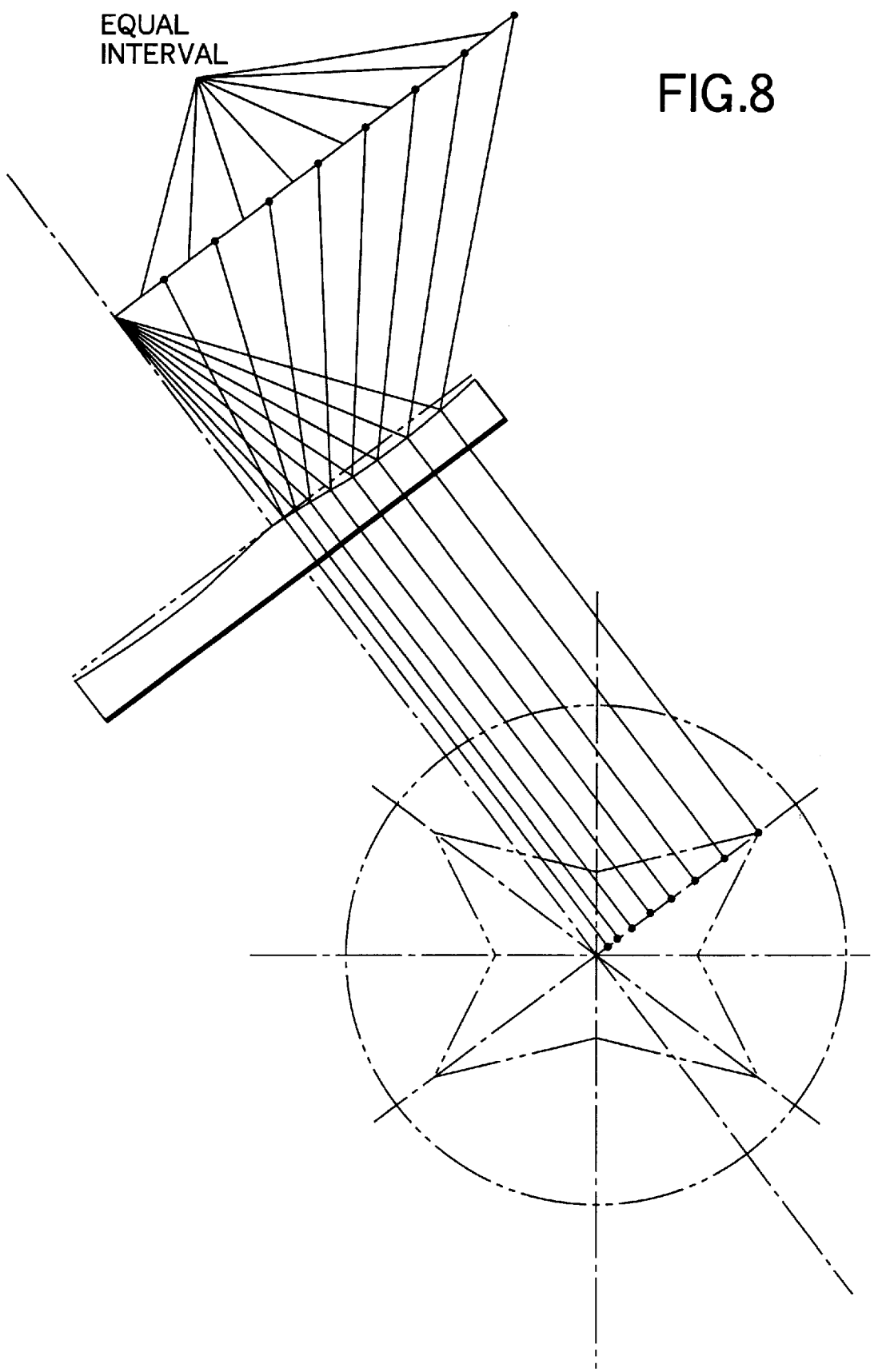
FIG. 8 is a view of a convex mirror employed in an onboard camera apparatus according to a third embodiment of the invention.

In view of the above, in the aspherical-surface convex mirror according to the third embodiment of the invention, as shown in FIG. 8, the radius of curvature of the convex mirror in the direction of the diagonal angle of view is varied according to positions in the direction of the diagonal angle of view, so that the intervals between the light rays, which are reflected by the reflecting surface in the direction of the diagonal angle of view and then arrive at the camera apparatus, can be made constant.

Thus, by varying the radius of curvature of the convex mirror in the direction of the diagonal angle of view according to positions in the direction of the diagonal angle of view, the distortion aberration can be reduced further, which makes it possible to make the camera apparatus more compact.

Hereinbefore, there are illustrated the embodiments in which the invention is applied as an onboard camera apparatus. However, the invention can also be widely applied to an ordinary monitor camera.

As can be seen clearly from the foregoing description, a camera apparatus according to the invention can be made compact and is capable of taking a picture over a wide angle of view.

Also, since a picture reflected by a convex mirror is taken, there is eliminated the need to point the camera main body directly at a subject, it is possible to increase the freedom of the installation place of the camera apparatus. Due to this, the camera apparatus can be disposed at a place where the design of the vehicle can be prevented from being spoiled. Further, while the camera apparatus is stored in the interior portion of the vehicle, the condition behind the rear portion of the vehicle can be displayed on a monitor by the camera apparatus.

While only certain embodiments of the invention have been specifically described herein, it will be apparent that numerous modifications may be made thereto without departing from the spirit and scope of the invention.

What is claimed is:

1. A camera apparatus comprising:
   a convex mirror including an aspherical reflecting surface; and
   a main camera body for taking a picture of an image reflected by said convex mirror;
   wherein the radius of curvature of the reflecting surface in the direction of the diagonal angle of view is larger than the radii of curvature of the reflecting surface in the directions of the horizontal and vertical angles of view.

2. The camera apparatus according to claim 1, wherein said camera main body is carried on a vehicle for taking a picture of the outside of the vehicle reflected by said convex mirror.

3. A camera apparatus comprising:
   a convex mirror including an aspherical reflecting surface; and
   a main camera body for taking a picture of an image reflected by said convex mirror;
   wherein the aspherical reflecting surface is non-disjoint and non-linear across its extend in each direction, and wherein the aspherical reflecting surface is different along the surface in the directions of the horizontal and vertical angles of view.

4. The camera apparatus according to claim 3, wherein said camera main body is carried on a vehicle for taking a picture of the outside of the vehicle reflected by said convex mirror.

* * * * *